United States Patent [19]
Bauer et al.

[11] Patent Number: 5,437,920
[45] Date of Patent: Aug. 1, 1995

[54] SOFT ASBESTOS-FREE SEALING MATERIAL

[75] Inventors: Gerhard Bauer, Neuenmarkt; Fritz E. Wolfshöfer, Bad Berneck, both of Germany

[73] Assignee: Frenzelit-Werke GmbH & Co. KG, Bad Berneck, Germany

[21] Appl. No.: 178,126

[22] Filed: Jan. 6, 1994

[30] Foreign Application Priority Data

Dec. 15, 1993 [DE] Germany .................. 43 42 811.8

[51] Int. Cl.⁶ ............................................. B32B 15/04
[52] U.S. Cl. .................................. 428/283; 428/288; 428/290; 428/297; 428/303; 428/324; 428/330; 428/474.4; 277/227; 277/228
[58] Field of Search ............... 428/224, 283, 290, 323, 428/474.4, 288, 297, 324, 303, 474.4; 279/227, 228

[56] References Cited

U.S. PATENT DOCUMENTS

| | | | |
|---|---|---|---|
| 4,042,747 | 8/1977 | Breton et al. | 428/323 |
| 4,387,178 | 6/1983 | Tracy et al. | 524/448 |
| 4,443,517 | 4/1984 | Shah | 428/281 |
| 4,485,138 | 11/1984 | Yamamoto et al. | 428/131 |
| 4,748,075 | 3/1988 | Beyer et al. | 428/221 |
| 5,272,198 | 12/1993 | Kaminiski et al. | 524/426 |
| 5,286,574 | 2/1994 | Foster | 428/457 |
| 5,306,553 | 4/1994 | Spillner et al. | 428/283 |

FOREIGN PATENT DOCUMENTS 2047298 11/1980 United Kingdom .

Primary Examiner—George F. Lesmes
Assistant Examiner—Kathleen L. Choi
Attorney, Agent, or Firm—Hill, Steadman & Simpson

[57] ABSTRACT

The present invention relates to sealing materials free from asbestos or other inorganic fibrous substances in the form of papers, paperboards, cardboards or plates. The gasket compositions preferably comprise a mixture of non-fibrillated organic fibers having an elongation at break of < 5% (up to 200° C.) and fibrillated P polyaramide fibers as well as, powdered graphite and an elastomeric resin binder. A new and improved process for making non-woven, planar sealing materials free from asbestos or other inorganic fibrous substances, is also provided. The reinforcement-forming and sheet-forming organic fibers, binders and fillers are homogenized in a mixer and the mixture is subsequently treated with heat and pressure to form the non-woven webs. The new asbestos-free sealing gaskets and materials may be used for technical or industrial applications such as secondary automobile gaskets, cylinder head gaskets, for seals or gaskets used in the construction of chemical plants and power plants, and for seals or gaskets used in the construction of heating systems.

13 Claims, 1 Drawing Sheet

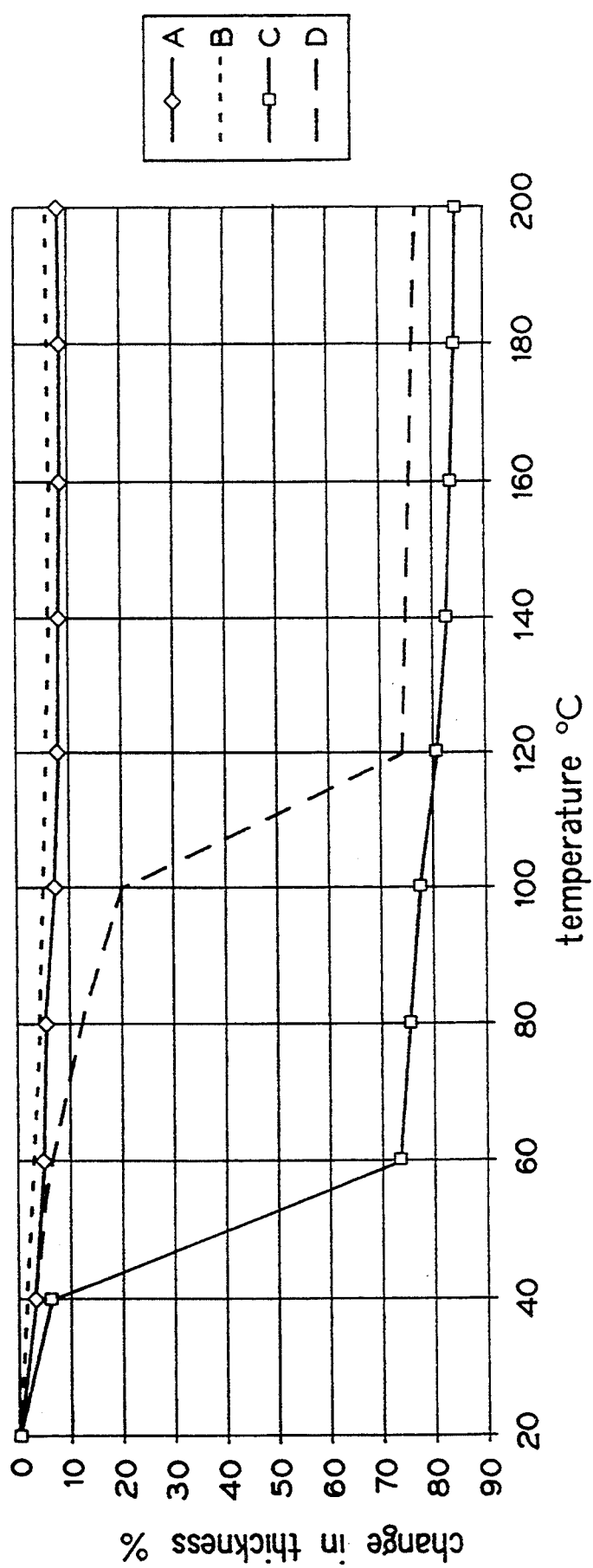

SOFT ASBESTOS-FREE SEALING MATERIAL

BACKGROUND OF THE INVENTION

The present invention concerns soft sealing materials which do not contain asbestos and other inorganic fibrous substances. More particularly it relates to new and improved non-woven sealing materials produced by means of paper processes or paper calendaring techniques from organic synthetic fibers, powdered graphite and polymeric binders. This invention also relates to the uses of these materials for the production of sealing materials for technical or industrial purposes, particularly such applications as seals or gaskets used in the construction of heating systems and also gaskets for use in the construction of chemical plants and power plants.

Asbestos, as well as all of the inorganic fibers lying within a certain fiber size distribution range, i.e., those having certain fiber lengths of between about 3 micrometers to about 5 micrometers ($>5/\mu m$, $\phi<3/\mu m$, length/$\phi=3:1$) are suspected of causing adverse effects injurious to health. In particular, health hazards associated with asbestos have been known for some time. The additional safety steps presently required for processing asbestos, as well as the other inorganic fibers, renders them uneconomical to use. Therefore, new materials which, if possible, do not contain the above-mentioned inorganic fibers are needed.

Conventional asbestos-free, soft-substance flat packing materials consist of either mixtures of various fiber kinds having mineral filler additives and organic binders (DE-PS 2914173 and DE-OS 3232255) or expanded graphite.

Fiber-free gaskets on the basis of expanded graphite are known. However, the expensive production difficulties resulting from their further processing prevent the success of these products on the market for lack of sufficient handling stability.

Developments using fiber-reinforced graphite are also known, for example, from U.S. Pat. No. 4,443,517. Prior gasket compositions employ organic binders in amounts of 3 to 8% which are necessary to obtain a sufficient cross-sectional tightness and for an economical manufacture. A total fiber content of about 6%, and more than 60% of flake graphite is used. This gasket formulation exhibits poor temperature stability in use.

Accordingly, it is an object of this invention to provide soft non-woven sealing materials, free of asbestos and other inorganic fibrous substances, having good temperature stability properties, which may be made in an ecologically beneficial manner using paper processes or paper calendaring techniques without the need for solvents or other offensive or corrosive chemicals or acids.

It is another object of the present invention to provide new and improved planar non-woven gasket materials useful in the production of special, highly stressed flat packings.

SUMMARY OF THE INVENTION

In accordance with these and other objects, the present invention provides a new and improved gasket composition for forming substantially planar sealing materials. The gasket composition comprises a non-woven web of interengaged fibers including non-fibrillated organic staple fibers and fibrillated organic fibers. The composition further includes a finely-divided graphite powder which is distinct from prior flaked graphite additives. An elastomeric resin binder is also present in the composition. The new and improved gasket compositions are substantially free of any inorganic fibrous materials.

In accordance with the preferred embodiment, the non-fibrillated organic fibers have a % elongation at break of less than 5% at temperatures up to about 200° C. and have a length dimension of less than 5 mm, and preferably between about 2.0 to about 4.0 mm. The non-fibrillated fibers may be selected from synthetic thermoplastic polymer fibers such as polyester fibers, polyamide fibers, polyaramid fibers and polybenzimidazole fibers. Especially preferably, the non-fibrillated fibers are high temperature resistant polyaramid fibers present in an amount of from about 0.5 to about 1.5% by weight, based on the weight of the gasket composition.

In the preferred embodiment, the fibrillated organic fibers are preferably polyaramid fibers formed from drawn oriented and flattened sheets or mechanically ground fibers to provide ribbon-like, as opposed to round, cross-sectional configurations. The fibrillated organic fibers are preferably present in an amount of from about 2 to 4% by weight based on the weight of the gasket composition.

In accordance with an important aspect of this invention, the gasket composition also includes finely divided graphite powder. The graphite powder preferably has a particle size distribution such that 98% of the graphite powder particles have a particle size of less than about 70 micrometers. The graphite powder is added in an amount of at least about 60% by weight, based on the weight of the gasket composition.

The elastomeric organic resin binder may be selected from natural synthetic rubbers such as chloroprene, neoprene, polyisoprene, polyisobutylene, butyl rubber, acrylonitrile-butadiene rubber (NBR), styrene-butadiene rubber (SBR) ethylene-propylene rubber (EPR) ethylene-propylene-diene rubber (EPDM) and the like. The elastomeric resin binder may be present in amounts of from about 3% to about 8% by weight, inclusive, based upon the weight of the gasket composition. The gasket composition may also comprise mineral fillers, curing agent additives, processing aids, stabilizers and the like added in their conventional amounts.

In accordance with another important aspect, the present invention provides a new and improved method for making a non-woven substantially planar sealing material, said method comprising:

forming an admixture including non-fibrillated organic staple fibers, fibrillated organic fibers, finely divided graphite powder and an elastomeric resin binder; agitating said admixture for a time sufficient to provide a web-forming composition including a well-distributed mass of interengaged fibers; and thereafter, subjecting said web forming composition to elevated temperature and pressure conditions to provide a substantially planar, non-woven web sealing material.

Other objects and advantages of this invention will become apparent from the following Detailed Descriptions, Drawing, and illustrative working Examples.

BRIEF DESCRIPTION OF THE DRAWING

FIG. 1 is a graphical plot showing changes in thickness dimensions of sealing materials in accordance with the prior art and in accordance with the present inven-

DETAILED DESCRIPTION OF THE INVENTION

The present invention provides a soft-substance sealing material free from asbestos or other inorganic fibrous substances, which may be prepared in the form of papers, paperboards, cardboards or plates. The material according to this invention includes reinforcement-forming and sheet-forming fibers, fillers and organic binders. More particularly, a preferred gasket forming composition comprises a mixture of non-fibrillated, particularly organic, fibers having a % elongation at break of greater than about 5% at temperatures up to about 200° C. and fibrillated P polyaramide fibers, as well as, powdered graphite.

The non-fibrillated organic fibers preferably have an elongation at break of <5% (up to 200° C.) and a length of 2 to 4 mm. The composition according to the invention contains them in an amount of 0.5 to 1.5% by weight.

The fibrillated organic fibers are polyaramid fibers, particularly substantially linear polyaramid fibers derived from 1,4-phenylenediamine units and terephthalic acid units. These fibers are commercially available under the tradename KEVLAR®, from DuPont®. The fibrillated organic fibers are present in the composition in an amount of about 2 to about 4% by weight.

The composition preferably contains at least 60% by weight of powdered graphite. The powdered graphite has a "fine powder" quality and a grain-size distribution such 98% of the powder particles have a particle size of less than about 70 micrometers. According to the invention, organic binders, particularly lattices, natural and synthetic rubbers such as NR, NBR, SBR and CR may be used as binders. The amount of elastomeric binders in the composition according to the invention is preferably from about 3 to about 8% by weight.

The gasket compositions of this invention may also include curing agents, processing aids, mineral fillers, pigments, stabilizers and other additives as desired. More particularly, illustrative curing agents may include vulcanizing agents, sulfur compounds, oxidizing agents, free-radical generators, organic peroxides, azo compounds, organic sulfur compounds and accelerants such as amines and imidazole compounds. Combinations of curing agents, accelerators and processing aids may also be used. For example, a combination of 0.9% by weight of zinc oxide, 0.1% of thiocarbanilide and 0.5% of ammonium sulfate comprising 1.5% by weight of the overall composition may be used. Other examples of non-sulfur vulcanization agents may include Vulkaresen PA 105® and a processing agent, Catiofast CS®, both of which brands are commercially available materials.

Other illustrative additives including heat stabilizers, UV stabilizers and anti-ozonants may be used, particularly phenolic antioxidant heat stabilizers, each being added in conventional amounts of up to about 2.0% by weight of the overall composition. These curing agents, processing aids and other additives are well known to those skilled in this art and they may be used herein in their conventionally employed amounts.

Furthermore, conventional fillers may be used additionally in such materials. In this case, finely divided mineral fillers such as micas, talcs, silicas, amorphous silicas, diatomaceous earth, barium sulfate, kaolin and clays, may be employed as fillers herein.

In an especially preferred embodiment, the composition according to the invention comprises of 70% by weight of powdered graphite, 0.9% by weight of P polyaramid staple fibers, 3.1% by weight of fibrillated P polyaramid fibers, 7% by weight of binder, 1.5% of curing and/or processing aid as well as 17.5% by weight of fillers.

In another preferred embodiment, the composition comprises: about 75% by weight of powdered graphite, 0.7% by weight of P polyaramid staple fibers, 3.3% by weight of fibrillated P polyaramid fibers, 4% by weight of binder, 1.5% by weight of curing and/or process aid as well as 15.5% by weight of fillers.

The present invention also relates to a process for the production of soft-substance sealing materials free from asbestos or other inorganic fibrous substances, in which the reinforcement-forming and sheet-forming organic fibers, binders and fillers are homogenized in a mixer and then the mixture is treated with heat and pressure. In particular, the material is made by means of paper processes or paper making—calendaring techniques. In this connection, the sheet-forming and reinforcing fibers are slightly ground jointly in a refiner, i.e., in a grinding device, preferably before they are suspended, so that the sheet-forming fibers mat together with the reinforcing fibers without increased fibrillation.

Illustrative processing conditions for making the non-woven planar sealing materials of this invention generally include exposing the web forming composition to elevated temperatures of at least about 100° C., preferably between about 100° C. to 130° C. in conventional papermaking equipment. Elevated pressures of above about 5 Newtons per square millimeter should also be used, preferably pressures of between about 5 to about 15 N/mm$_2$ are employed. In calendaring equipment, the web forming compositions are preferably exposed to elevated temperatures of between about 135° to about 160° C. and elevated pressures of between about 20 to about 40 N/mm$^2$.

The high temperature resistant compositions and sealing gasket materials made according to the invention are well suited for use as sealing materials for technical or industrial purposes, particularly for secondary automobile gaskets, cylinder head gaskets, seals or gaskets used in the construction of chemical plants and in power plants, as well as, for gaskets or seals used in the construction of heating systems.

Surprisingly, it has turned out that the required temperature stability is achieved when non-fibrillated organic fibers, particularly P polyaramide fibers having an elongation at break of <5% (up to 200° C.) and a length of 2 to 4 mm, are added in an amount of as little as 0.5 to 1.5% by weight to the compositions. On testing, it has been determined that measurements of compression set at 50 N/mm$^2$ pressure per unit area and at temperatures increased from 20° C. to 200° C. has resulted in less than a 10% change in thickness.

A person skilled in the art is familiar with the fact that non-fibrillated fibers generally have insufficient sheet-forming properties in economical paper processes. In addition, the introduction of organic fiber amounts sufficient for the sheet formation, usually also causes further reduction of the temperature stability, and in the case of para-polyaramid (p-phenylene terephthalamide) fibers, uneconomical price increases.

Surprisingly, it has turned out additionally that, when powdered graphite of "fine powder" quality and a grain-size distribution of 98% <70/μm is employed, sheet-forming properties are achieved with the addition of as little as 2 to 4% by weight of fibrillated P polyaramide fibers.

As an overall effect, it has been found that the combined use of powdered graphite having the described grain-size distribution and a mixture consisting of reinforcing and sheet-forming fibers, non-fibrillated organic fibers having an elongation at break of <5% (up to 200° C.), particularly a length of 2 to 4 mm, being used as the reinforcing fibers and fibrillated P polyaramide fibers being used as the sheet-forming fibers, provides gasket materials which may be prepared in an economic production processes having properties capable of meeting the technological demands made on today's sealing materials.

This especially economic manufacturing method enables the seals made from the composition material according to the invention to be used in a wide range of applications from the construction of heating systems to the automobile field. Cylinder head gaskets and other seals useful in the construction of chemical plants and power plants may also be made and provided by the materials and methods of this invention.

The environmentally beneficial production by means of paper processes or paper and calendar techniques makes it possible to dispense with solvents (presently used in the calendar technique) aggressive acids (expanded graphite) and inorganic fibers (presently used in the paper technology of cylinder head gaskets).

DESCRIPTION OF THE PREFERRED EMBODIMENTS

Table 1 below lists formulations for the compositions according to the invention in Example 1 and Example 2, as well as, comparative formulations of Example A and Example B. The materials were produced on a paper machine. The listed values are based on % by weight of the overall composition.

TABLE 1

| Example/pbw | 1 | 2 | A | B |
|---|---|---|---|---|
| powdered graphite | 70 | 75 | — | 70 |
| flake graphite | — | — | 70 | — |
| P polyaramide staple | 0.9 | 0.7 | 0.9 | — |
| P polyaramide fibril | 3.1 | 3.3 | 3.1 | 4 |
| SBR binder | 7 | 4 | 7 | 7 |
| curing/processing aid | 1.5 | 1.5 | 1.5 | 1.5 |
| fillers | 17.5 | 15.5 | 17.5 | 17.5 |
| Total parts by weight | 100 | 100 | 100 | 100 |

The compression set of the sealing materials prepared according to Examples 1–2 and A–B at 50 N/mm² was determined in accordance with DIN 3754. The results are shown in FIG. 1.

FIG. 1 shows that the materials according to this invention, Examples 1 and 2, have a change in thickness of less than 10% when the temperature is increased from +20° C. to 200° C., whereas comparative Examples A and B show marked changes in thickness at 60° C. and 120° C., respectively. FIG. 1 shows the marked advantages of the composition and sealing materials provided by the present invention.

Each of the above-mentioned patents and publications are specifically incorporated herein by reference.

Although the present invention has been described with reference to certain preferred embodiments, modifications or changes may be made therein by those skilled in this art. For example, instead of having both the nonfibrillated and fibrillated fibers be comprised of polyoramid, the non-fibrillated fiber may be a high temperature resistant benzimidazole filter. Instead of using an NBR or SBR resin binder, an EPDM binder may be substituted. All such obvious modifications or changes may be made herein by those skilled in this art without departing from the scope and spirit of this invention as defined by the appended claims.

What is claimed is:

1. A non-woven gasket composition for forming substantially planar sealing materials, said gasket composition comprising:

a non-woven web of inter-engaged fibers including nonfibrillated organic staple fibers having an elongation at break of less than about 5% at temperatures up to about 200° C., from about 2 to about 4% by weight, based on the weight of the gasket composition, of fibrillated polyaramide fibers, at least about 60% by weight, based on the weight of the gasket composition, of finely-divided graphite powder, the graphite powder having a particle size distribution such that 98% of the graphite powder has a particle size less than about 70 micrometers, and an elastomeric resin binder, said composition being substantially free of inorganic fibrous materials and having sufficient sheet forming properties such that the composition form a web by calendering at elevated temperature and pressure conditions, the non-woven web having a temperature stability such that there is less than a 10% change in thickness of the web under a compression of 50 Newtons per square millimeter as the temperature is increased from 20° C. to 200° C.

2. A non-woven gasket composition as defined in claim 1, wherein said graphite powder is present in an amount greater than 70% by weight based on the weight of the gasket composition.

3. A non-woven gasket composition for forming substantially planar sealing materials, said gasket composition consisting essentially of:

a non-woven web of inter-engaged fibers including nonfibrillated organic staple fibers having an elongation at break of less than about 5% at temperatures up to about 200° C., from about 2 to about 4% by weight, based on the weight of the gasket composition, of fibrillated polyaramide fibers, at least about 60% by weight, based on the weight of the gasket composition, of finely-divided graphite powder, based on the weight of the gasket composition, the graphite powder having a particle size distribution such that 98% of the graphite powder has a particle size less than about 70 micrometers, and an elastomeric resin binder, said composition being substantially free of inorganic fibrous materials and having sufficient sheet forming properties such that the composition form a web by calendering at elevated temperature and pressure conditions, the non-woven web having a temperature stability such that there is less than a 10% change in thickness of the web under a compression of 50 Newtons per square millimeter as the temperature is increased from 20° C. to 200° C.

4. A gasket composition as defined in claim 1, wherein said non-fibrillated organic fibers have a length of from about 2 to about 4 mm.

5. A gasket composition as defined in claim 1, wherein the non-fibrillated organic fibers are present in an amount of from about 0.5 to about 1.5% by weight, based upon the weight of the gasket composition.

6. A gasket composition as defined in claim 1, wherein the non-fibrillated organic fibers are selected from the group consisting of polyester fibers, polyamide fibers, polyaramid fibers, and polybenzimidazole fibers.

7. A gasket composition as defined in claim 1, wherein the non-fibrillated organic fibers are polyaramid fibers.

8. A gasket composition as defined in claim 1, further comprising mineral filler.

9. A gasket composition as defined in claim 8, wherein said composition comprises about 70% by weight of graphite powder, about 0.9% by weight of non-fibrillated polyaramid staple fibers, about 3.1% by weight of fibrillated polyaramid fibers, about 7% by weight of elastomeric resin binder, about 1.5% by weight of curing agent and about 17.5% by weight of mineral filler, based upon the weight of the gasket composition.

10. A gasket composition as defined in claim 8, wherein said composition comprises about 75% by weight of graphite powder, about 0.7% by weight of non-fibrillated polyaramid staple fibers, about 3.3% by weight of fibrillated polyaramid fibers, about 4% by weight of elastomeric resin binder, about 1.5% by weight of curing agent, and about 15.5% by weight of mineral filler, based upon weight of the gasket composition.

11. A gasket composition as defined in claim 1, wherein said elastomeric resin binder is selected from organic binders including natural and synthetic elastomers.

12. A gasket composition as defined in claim 11, wherein said elastomeric resin binder is selected from the group consisting of chloroprene, neoprene, polyisoprene, polyisobutylene, butyl rubber, acrylonitrile-butadiene rubber (NBR), styrene-butadiene rubber (SBR), ethylene-propylene rubber (EPR) and ethylene-propylene-diene rubber (EPDM).

13. A gasket composition as defined in claim 8, wherein said mineral filler is selected from the group consisting of mica, talc, silica, diatomaceous earth, barium sulfate, kaolin and clay.

* * * * *